US008555187B2

(12) United States Patent
Margolin (10) Patent No.: US 8,555,187 B2
(45) Date of Patent: Oct. 8, 2013

(54) SERVER-BASED DATA SHARING IN COMPUTER APPLICATIONS USING A CLIPBOARD (75) Inventor: Ben Margolin, San Mateo, CA (US)

(73) Assignee: Google Inc., Mountain View, CA (US)

(*) Notice: Subject to any disclaimer, the term of this patent is extended or adjusted under 35 U.S.C. 154(b) by 277 days.

(21) Appl. No.: 12/976,487

(22) Filed: Dec. 22, 2010

(65) Prior Publication Data
US 2011/0202971 A1 Aug. 18, 2011

Related U.S. Application Data (60) Provisional application No. 61/305,123, filed on Feb. 16, 2010.

(51) Int. Cl.
G06F 3/048 (2013.01)
(52) U.S. Cl.
USPC .......................... 715/770; 715/748
(58) Field of Classification Search
USPC .................................. 715/748, 770
See application file for complete search history.

(56) References Cited

U.S. PATENT DOCUMENTS

| 5,765,156 | A | * | 6/1998 | Guzak et al. | 707/756 |
|---|---|---|---|---|---|
| 5,924,099 | A | * | 7/1999 | Guzak et al. | 715/769 |
| 5,964,834 | A | * | 10/1999 | Crutcher | 709/213 |
| 6,338,084 | B1 | * | 1/2002 | Rankin et al. | 709/214 |
| 6,901,455 | B2 | * | 5/2005 | Gough | 710/8 |
| 7,509,577 | B2 | * | 3/2009 | Kuwata et al. | 715/256 |
| 7,526,768 | B2 | * | 4/2009 | Schleifer et al. | 719/310 |
| 7,533,349 | B2 | * | 5/2009 | Saul et al. | 715/769 |
| 7,818,458 | B2 | * | 10/2010 | Andersen | 709/248 |
| 7,870,493 | B2 | * | 1/2011 | Pall et al. | 715/751 |
| 7,917,507 | B2 | * | 3/2011 | Kim et al. | 707/736 |
| 7,933,296 | B2 | * | 4/2011 | Augustine et al. | 707/806 |
| 7,950,066 | B1 | * | 5/2011 | Zuili | 715/770 |
| 8,020,112 | B2 | * | 9/2011 | Ozzie et al. | 715/770 |
| 8,161,401 | B2 | * | 4/2012 | Chen et al. | 715/770 |
| 8,171,390 | B1 | * | 5/2012 | Channakeshava | 715/221 |
| 8,296,671 | B2 | * | 10/2012 | Narayanan et al. | 715/770 |
| 8,370,423 | B2 | * | 2/2013 | Ozzie et al. | 709/203 |
| 8,386,558 | B2 | * | 2/2013 | Schleifer et al. | 707/610 |
| 8,429,551 | B2 | * | 4/2013 | Kim et al. | 715/770 |

(Continued)

OTHER PUBLICATIONS

"Live Clipboard", Wikipedia article with its revision history, http://en.wikipedia.org/wiki/Live_Clipboard, May 12, 2010.*

(Continued)

Primary Examiner — Stephen Hong
Assistant Examiner — Joseph R Burwell
(74) Attorney, Agent, or Firm — Fish & Richardson P.C.

(57) ABSTRACT

A computer-implemented method of sharing data between computer applications is discussed. The method includes receiving, at an application server sub-system of a hosted computer server system and from a first computing device that is remote from the hosted computer server system, commands interacting with an electronic document served by the application server sub-system, and receiving at the hosted computer server system a command to copy content from the electronic document to an electronic clipboard. The method also includes storing, at a clipboard server sub-system of the hosted computer server system, that is separate from the application server sub-system, data that represents the content, receiving a request for the stored data that represents the content, and delivering, from the clipboard server sub-system to a second computing device, the data that represents the content.

19 Claims, 7 Drawing Sheets (56) References Cited

U.S. PATENT DOCUMENTS

| | | | |
|---|---|---|---|
| 8,453,066 B2* | 5/2013 | Ozzie et al. | 715/764 |
| 2002/0138653 A1* | 9/2002 | Ogura | 709/246 |
| 2002/0174241 A1* | 11/2002 | Beged-Dov et al. | 709/230 |
| 2004/0100496 A1* | 5/2004 | Creasor et al. | 709/216 |
| 2004/0210846 A1* | 10/2004 | Olsen | 715/761 |
| 2004/0236781 A1* | 11/2004 | Williams | 707/102 |
| 2005/0004986 A1* | 1/2005 | Aoki et al. | 709/206 |
| 2005/0066335 A1* | 3/2005 | Aarts | 719/316 |
| 2005/0102630 A1* | 5/2005 | Chen et al. | 715/770 |
| 2005/0203935 A1* | 9/2005 | McArdle | 707/101 |
| 2006/0047669 A1* | 3/2006 | Durrence et al. | 707/10 |
| 2006/0155821 A1* | 7/2006 | Pichetti et al. | 709/213 |
| 2007/0157101 A1* | 7/2007 | Indiran et al. | 715/769 |
| 2008/0109464 A1* | 5/2008 | Ozzie et al. | 707/101 |
| 2008/0109832 A1* | 5/2008 | Ozzie et al. | 719/329 |
| 2008/0141136 A1* | 6/2008 | Ozzie et al. | 715/723 |
| 2008/0196040 A1* | 8/2008 | Mochel et al. | 719/316 |
| 2008/0240010 A1* | 10/2008 | Vasudevan et al. | 370/312 |
| 2008/0282180 A1* | 11/2008 | Glasgow et al. | 715/770 |
| 2009/0083286 A1* | 3/2009 | Tamura | 707/10 |
| 2009/0100503 A1* | 4/2009 | Doyle | 726/3 |
| 2009/0132815 A1 | 5/2009 | Ginter et al. | |
| 2009/0248695 A1* | 10/2009 | Ozzie et al. | 707/10 |
| 2009/0276792 A1 | 11/2009 | Berry et al. | |
| 2009/0319671 A1 | 12/2009 | Richardson et al. | |
| 2010/0192221 A1* | 7/2010 | Waggoner | 726/19 |
| 2011/0047506 A1* | 2/2011 | Miller | 715/808 |
| 2012/0096368 A1* | 4/2012 | McDowell | 715/748 |
| 2012/0216126 A1* | 8/2012 | Trivedi et al. | 715/748 |

OTHER PUBLICATIONS

MSDN archive, "Live Clipboard", http://archive.msdn.microsoft.com/liveclipboard/, Oct. 8, 2009.*
"Wintellect Cloudboard", http://cloudboard.codeplex.com/, Aug. 17, 2009.*
"Announcing Wintellect's Power Live Framework Library", Jeffrey Richter's Blog article, http://www.wintellect.com/cs/blogs/jeffreyr/archive/2009/05/26/announcing-wintellect-s-power-live-framework-library.aspx, May 26, 2009.*
Ray Ozzie, "Wiring the Web", http://web.archive.org/web/20060807225324/rayozzie.spaces.live.com/blog/cns!FB3017FBB9B2E142!285.entry, Mar. 7, 2006.*
Nat Torkington, "ETech: Ray Ozzie", http://radar.oreilly.com/print/2006/03/etech-ray-ozzie.html, Mar. 7, 2006.*
"Copy Structured Data Between Web Sites Through RSS", http://www.masternewmedia.org/news/2006/03/31/copy_structured_data_between_web.htm, Mar. 31, 2006.*
"The Citrix Clipboard (Part I)", Citrix Blogger article, http://citrixblogger.org/2007/05/27/the-citrix-clipboard-part-i/, May 27, 2007.*
"The Citrix Clipboard (Part II)", Citrix Blogger article, http://citrixblogger.org/2007/05/30/the-citrix-clipboard-part-ii/, May 30, 2007.*
"Not Cut and Dry, Cut and Paste", Citrix Blogger article, http://citrixblogger.org/2007/08/13/not-cut-and-dry-cut-and-paste/, Aug. 13, 2007.*
"Clipboard Enhancements", Citrix Blogger article, http://citrixblogger.org/2008/06/12/clipboard-enhancements/, Jun. 12, 2008.*
"Why Does My Shared Clipboard Not Work? (Part 1)", MSDN Blogs, Remote Desktop Services Blog article, http://blogs.msdn.com/b/rds/archive/2006/11/16/why-does-my-shared-clipboard-not-work-part-1.aspx, Nov. 16, 2006.*
"Why Does My Shared Clipboard Not Work? (Part 2)", MSDN Blogs, Remote Desktop Services Blog article, http://blogs.msdn.com/b/rds/archive/2006/11/20/why-does-my-shared-clipboard-not-work-part-2.aspx, Nov. 20, 2006.*
"Google Cloudboard", http://googlesystem.blogspot.com/2009/10/google-cloudboard.html, Oct. 6, 2009.*
Parfeni, "Google Test Cloudboard, a Web-Based Clipboard Replacement", http://news.softpedia.com/news/Google-Tests-Cloudboard-a-Web-Based-Clipboard-Replacement-123642.shtml, Oct. 7, 2009.*

Miller et al., "Synchronizing Clipboards of Multiple Computers", Proceedings of the 12th annual ACM symposium on User interface software and technology (UIST '99), pp. 65-66, 1999.*
Aune, "17 Noteworthy Alternatives to Google Notebook", Jan. 25, 2009, http://mashable.com/2009/01/25/notetaking-alternatives/.*
Slay et al., "A clipboard model for Ubiquitous Computing Environments", Proceedings of the 4th International symposium on information and communication technologies (WISICT '05), pp. 173-178, 2005.*
Authorized Officer Lee W. Young, International Search Report and Written Opinion for Application No. PCT/US11/25085, mailed Apr. 20, 2011, 2pages.
'acm.org—ACM DL Digital Library,' [online]. Slay, "A clipboard model for ubiquitous computing environments," 2005, WISICT '05 Proceedings of the $4^{th}$ International Symposium on Information and Communication Technologies, pp. 173-178. Abstract available at http://dl.acm.org/citation.cfm?id=1071786 (Abstract Only—2 pages).
Atwood, 'Codinghorror,' [online] "Coding horror-programming and human factors: Improving the clipboard," 2005, [retrieved on Feb. 6, 2013]. Retrieved from the Internet: URL<http://www.codinghorror.com/blog/2005/10/improving-the-clipboard.html>. 2 pages.
'Bluemars.org' [online] "ClipX," 2004-2008, [retrieved on Feb. 6, 2013]. Retrieved from the Internet: URL<http://bluemars.org/clipx/>. 6 pages.
Hertzfeld, 'Folklore.org' [online]. "Macintosh Stories: Desk Ornaments," 1981, [retrieved on Feb. 6, 2013]. Retrieved from the Internet: URL<http://folklore.org/StoryView.py?story=Desk_Ornaments.txt>. 4 pages.
'eBrand' [online] "Microsoft debuts web-to-PC clipboard," 2006, [retrieved on Feb. 6, 2013]. Retrieved from the Internet: URL< http://news.ebrandz.com/microsoft/2006/758-microsoft-debuts-web-to-pc-clipboard.html>. 2 pages.
Farber, 'ZDNet' [online]. "Ray Ozzie proposes universal web clipboard," 2006, [retrieved on Feb. 6, 2013]. Retrieved from the Internet: URL< http://www.zdnet.com/blog/btl/ray-ozzie-proposes-universal-web-clipboard/2670>. 2 pages.
Harris, 'Blogs.msdn.com' [online]. "No Distaste for Paste (Why the UI, Part 7)," 2006, [retrieved on Feb. 6, 2013]. Retrieved from the Internet: URL< http://blogs.msdn.com/b/jensenh/archive/2006/04/07/570798.aspx>. 2 pages.
'Nakka.com' [online] "CLCL," 2005, [retrieved on Feb. 6, 2013]. Retrieved from the Internet: URL<http://www.nakka.com/soft/clcl/index_eng.html>. 2 pages.
'Searchsoftwarequality.techtarget.com' [online]. "How ajax makes it easier to steal information from your clipboard," 2006, [retrieved on Feb. 6, 2013]. Retrieved from the Internet: URL<http://searchsoftwarequality.techtarget.com/...-Ajax-makes-it-easier-to-steal-information-from-your-clipboard?vgnextfmt=print>. 2 pages.
'techcrunch.com' [online]. "The next-gen web: browser storage support," 2008, [retrieved on Feb. 6, 2013]. Retrieved from the Internet: URL<http://techcrunch.com/2008/05/29/the-next-gen-web-browser-storage-support/>. 3 pages.
'www.techrepublic.com' [online]. "Abusing HTML 5 structured client-side storage," 2008, [retrieved on Feb. 25, 2013]. Retrieved from the Internet: URL< http://www.techrepublic.com/whitepapers/abusing-html-5-structured-client-side-storage/2321649>. (Abstract Only—2 pages).
'www.onilne-tech-tips.com' [online] "Store multiple items to the windows clipboard using ClipX," 2008, [retrieved on Feb. 6, 2013]. Retrieved from the Internet: URL<http://www.online-tech-tips.com/free-software-downloads/windows-clipboard-manager/>. 3 pages.
'www.securelist.com' [online]. "Trojan-Spy.Win32.Small.r," 2007, [retrieved on Feb. 6, 2013]. Retrieved from the Internet: URL<http://www.securelist.com/en/descriptions/old41831?>. 2 pages.
International Preliminary Report on Patentability in International Application No. PCT/US2011/025085, mailed Aug. 30, 2012, 6 pages.

* cited by examiner

SERVER-BASED DATA SHARING IN COMPUTER APPLICATIONS USING A CLIPBOARD

CROSS-REFERENCE TO RELATED APPLICATIONS

This application is a non-provisional of and claims priority to U.S. Provisional Application No. 61/305,123, filed Feb. 16, 2010, the entire contents of which are incorporated herein by reference.

TECHNICAL FIELD

This document describes techniques and systems for sharing data between applications in hosted server-based services.

BACKGROUND

Hosted computing services—also known as cloud computing services—are services made available to the public over the internet by third parties, where applications are executed from servers and the results of such execution are presented to users, typically through web browsers. Hosted computer services provide to a wide range of users a variety of solutions, such as mapping, internet search, productivity applications (word processing, spreadsheet, presentation, and e-mail), personal finance packages, enterprise resource management, and many other services. Such applications can be made richer by using techniques such as asynchronous JavaScript and XML (AJAX).

Desktop operating systems and associated computer applications provide for local storage and execution of applications, including productivity applications. Modern operating systems generally permit for "cut-and-paste" operations so that data may be moved from a first location to a second location, including between two different applications. In certain instances, the formatting of the data can also be preserved via translation from a first application to a second application on the computing device. In addition, active links may be maintained between instances of data in computer applications using features such as Dynamic Data Exchange (DDE) or Object Linking and Embedding (OLE). The sharing of data between applications is frequently implemented using a clipboard paradigm, whereby data is cut from a first application onto a clipboard, from which it may later be accessed for pasting into other applications.

SUMMARY

This document describes techniques by which data may be shared using a clipboard paradigm in hosted computing applications. In particular, a first server sub-system may be employed to interact with a user of a web browser who is editing a document, such as a word processing document, or other form of document such as a spreadsheet, an image, or an electronic mail message, among other things. As part of this interaction, the user may choose to cut or copy content from a document or paste content into a document. Such content may be copied to or from a clipboard that is stored at the hosted computer system and managed by a clipboard server sub-system. Such a clipboard server sub-system may interact with a child element of a container document on the user's web browser. The container document (which may be sourced from another server sub-system) and the child element or document (e.g., an iFrame or other element) may communicate with their respective server sub-systems and with each other, so that clipboard items (e.g., individual pieces of content that may be accessed separately from a clipboard) may be provided to the child element and in turn provided to the container document, where they can be added to the document with which the user is currently interacting.

Such sharing of content via a server-based clipboard system may also occur across multiple computing sessions and different computers. For example, a user may copy content to a clipboard that has been associated with the user's on-line account (e.g., by the user signing onto a hosted server and authenticating themselves to it, such as via a password and user ID). The user may then move to a different computer, such as from their work PC to their smart phone, to their home PC, or to an internet café PC, and may log on to the service using their same account. They may then paste the content into a document while operating within their account with the service from a different computer. As a second example, a first user may copy content to a hosted clipboard, and may provide identifiers (e.g., email addresses or a group identifier) of other users with whom they would like to share the content. Those other user may then be notified of the presence of the new content along with a pointer to the content (e.g. a URL that points to the particular entry in the clipboard), and may simply access a clipboard and then paste the content into their own documents if they want to. As yet another example, a user may copy or cut a number of different entries into a hosted clipboard, and each entry may be made available for later selection by the user for pasting individually into another document; the user may also be allowed to select multiple of the entries and have them automatically combined into a document, in order, for the user (e.g., in an in-line document stored under the user's account). Such interactions could also occur by multiple browser channels being open at once between a user's computer and a hosted system, where the user may be editing a different document via each of the different open channels, and may copy content from one document to another via the hosted system.

Such techniques may, in certain implementations, provide one or more advantages. For example, data that is stored in a cloud-based clipboard, or cloudboard, may be passed between different client devices, whether those devices are associated with the user who initially placed the data on the cloudboard or with other users. Thus, data may be shared easily between and among multiple different users, where the appropriate users have permitted such sharing. Also, large amounts of data may be stored, even where a client device would not otherwise be able to store the information. Thus, multiple different large sets of data may be stored as distinct clips to, or items in, a cloudboard even when it would be impractical to manage so much content on a client device. The data in a clipboard may also be shared between different log in sessions for a device operating system, such as when a user copies content to the cloudboard, shuts down their device for the night, and then resumes editing operations on a document after rebooting in the morning. Moreover, sharing of data may be provided as easily in cloud-based applications as for traditional desktop applications, and with the additional benefits mentioned here as well.

In one implementation, a computer-implemented method of sharing data between computer applications is disclosed. The method comprises receiving, at an application server sub-system of a hosted computer server system and from a first computing device that is remote from the hosted computer server system, commands interacting with an electronic document served by the application server sub-system. The method also comprises receiving at the hosted computer server system a command to copy content from the electronic document to an electronic clipboard, and storing, at a clipboard server sub-system of the hosted computer server system, that is separate from the application server sub-system, data that represents the content. Furthermore, the method comprises receiving a request for the stored data that represents the content, and delivering, from the clipboard server sub-system to a second computing device, the data that represents the content.

In some aspects, the second computing device is different from the first computing device. In addition, the method can also include determining that the second computing device has authority to access the data that represents the content by determining that the second client device has been authenticated to a user account that matches a user account to which the first client device was authenticated. The method can further include determining that the second computing device has authority to access the data that represents the content, by accessing a user account to which the first computing device was authenticated when the data was stored at the hosted computer system and locating an identifier for a user account to which the second computing device is authenticated. Moreover, the application server sub-system can interact with a container document of a browser executing on the first computing device, and the clipboard server sub-system can interact with a child of a container document of a browser executing on the second computing device that correlates to the container document of the browser executing on the first computing device.

In certain aspects, the method further comprises receiving from the first computing device a command to show the contents of a clipboard, and delivering from the clipboard computer server sub-system to the first client device, data that represents each item in a clipboard determined to correspond to a user account to which the first computing device has been authenticated. The method can also comprise receiving from the first computing device a command to paste content from the clipboard computer server sub-system into a document, and providing the content from the clipboard computer server sub-system to a child element that is operating inside a container document into which he content is to be pasted. Moreover, the method can include receiving from the first computing device a content format indicator and translating the content to a format that corresponds to the content format indicator before providing the content to the child element. In other aspects, the electronic document can be selected from a group consisting of a word processing document, a spreadsheet, a presentation document, and an electronic mail message.

In another implementation, a computer-implemented system for sharing data between computer applications on a hosted computer service is disclosed. The system includes one or more web servers arranged to interact over the internet with computing devices that are remote from the hosted computer service, and an application server sub-system to provide data, through the one or more web servers, for displaying interactive computer applications in container documents on browsers of the computing devices. The system further comprises a clipboard server sub-system storing content that is correlated to user accounts of the hosted computer service, and programmed to provide the content to child elements inside the container documents, wherein the content is formatted to include in the interactive computer applications. The application server sub-system can also be programmed to save the content with a document being edited in the container document after the content has been added to the document being edited in he container document. In addition, the system can comprise an authentication server sub-system programmed to associated user accounts with each of the computing devices, and to provide user account identifiers to the clipboard server sub-system for determining a user-account to associated with each clipboard entry.

In some aspects, the authentication server sub-system is further programmed to cooperate with the clipboard server sub-system to identify users, other than a user who corresponds with a particular clipboard, that may access one or more items of content from the particular clipboard. Also, accessibility by a user to an item of content in a particular clipboard can be determined by analyzing a user list prepared by a user that corresponds to the particular clipboard. Moreover, the application server sub-system can be programmed to interact with a container document of a browser executing on a first computing device, and the clipboard server sub-system is programmed to interact with a child element of a container document of a browser executing on a second computing device, wherein the container document of the browser on executing on the second computing device correlates to the container document of the browser executing on the first computing device.

In yet other aspects, the clipboard server sub-system is further programmed to receive from the first computing device a command to show the contents of a clipboard, and in response, to deliver from the clipboard computer server sub-system to the first client device, data that represents each item in a clipboard determined to correspond to a user account to which the first computing device has been authenticated. The clipboard server sub-system can be further programmed to receive from the a first container document a command to paste content from the clipboard into a document inside the first container document, and providing the content from the clipboard to a child element that is operating inside the first container document. In, the clipboard server sub-system can be programmed further to receive a content format indicator and translate the content to a format that corresponds to the content format indicator before providing the content to a child element.

In another implementation, a computer-implemented system for sharing data between computer applications on a hosted computer service is disclosed that includes one or more web servers, an application server sub-system, and means for receiving content from a first application executed on the application server sub-system and for providing the received content to a second application executed on the application server sub-system.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which users of a hosted computing service or system may copy-and-paste, or otherwise share, pieces of content between different documents, including between documents in two different types of computer applications, and between different client computing devices. The applications may be served into container documents that are presented on browsers executed on a user's client computing devices (e.g., personal computers, netbooks, and smart phones), using techniques such as Asynchronous JavaScript and XML (AJAX) in familiar manners. Such serving may be managed by application servers at the hosted service. The content that is moved between documents and/or applications may be managed by clipboard servers at the service that are separate from the application servers. The clipboard servers may communicate with a child element that is contained in the container document. The container document and the child element may each operate by separately executing JavaScript or similar code, and the child element may communicate with the container document to show information about items in a clipboard that is accessible through the service, to the application running in the container document. In a similar manner, content may be passed from the container document to the clipboard element on the client, and may in turn be provided to the clipboard servers and stored there until it is requested by another authorized user (including the user who placed the content in the clipboard).

In certain implementations, such content copying functionality can be provided in combination with a clipboard on a client device that is managed, for example, by an operating system of the device. For example, following traditional UI mechanisms, the pressing of CTRL+C keys on a keyboard may result in copying of selected content to a local clipboard, whereas a different selection (e.g., a menu selection in an application running in a browser) may cause the content to be copied to a cloudboard instead. A system could also be arranged to treat any such copying command to cause copying both to the local clipboard and to the cloudboard. Alternatively, an invocation of a copying command may cause a menu to be displayed, from which the user can manually select which of the two clipboards (i.e., the local clipboard or the cloudboard) the data should be copied to (or from, when the selection is of a paste command).

Figure 1:
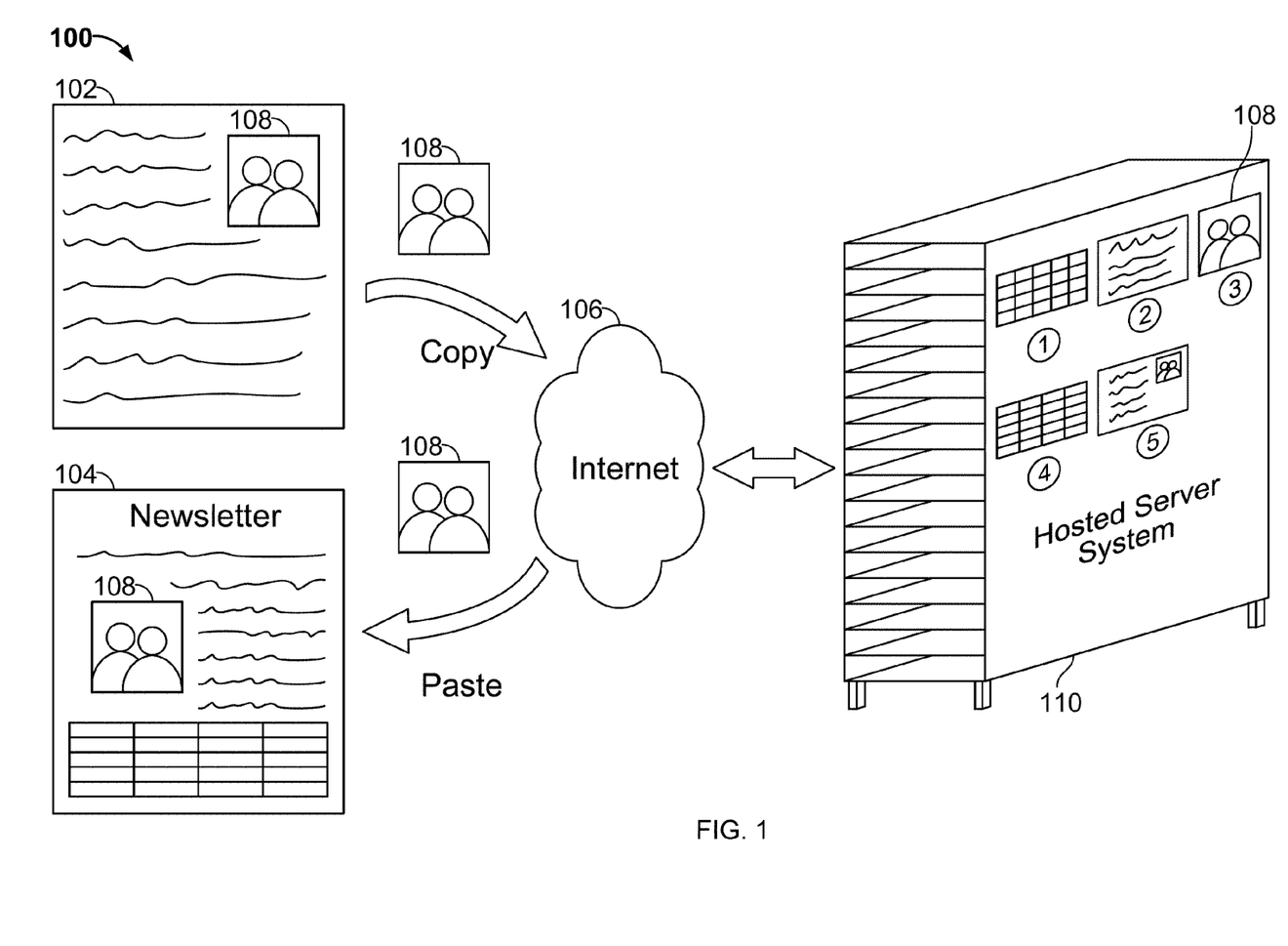
FIG. 1 is a conceptual diagram of a hosted system providing clipboard functionality.

FIG. 1 is a conceptual diagram of a hosted system 100 that provides hosted clipboard functionality. The system 100 is shown here as involving two word processing documents 102, 104 that have shared a common piece of content in the form of an image 108, through the internet 106, and using a hosted server system 110. The content in this example was shared by a user, who was operating with document 102, by selecting the image 108 and then selecting on-screen controls to copy the image 108 to a system clipboard. The content was then accessed from the clipboard on the hosted system, such as by a user operating with document 104, by the user selecting a clipboard command from an on-screen menu, and then selecting the particular image 108 from a list of multiple pieces of content that were displayed to the user.

In this example, the documents 102 may have been displayed in web-based container documents in the presentation pane of a web browser. The container documents may have initially been loaded when a user chose to execute a web-based application, such as a cloud-based word processing application. JavaScript or other similar code may have been accessed from mark-up code that was loaded by the user's browser so as to cause the application to be displayed in the user's browser, in cooperation with web servers and application servers at the hosted server system 110. Additional code may have been loaded, and may have been, or may be, executed to provide hosted clipboard functionality for the user. Such additional code may communicate, not with the application servers, but with clipboard servers hosted by the hosted server system 110. The clipboard servers may be generally application-independent, in that they can receive content from, and provide content to, a variety of different applications (e.g., word processing, spreadsheet, etc.), and can also translate the content as necessary when it is moved between two different applications.

A user who interacts with document 104 may use the system 100 in ways similar to a user who accesses document 102. In fact, although the documents here may be accessed on different computers by different users who log into the hosted server system 110, the same user may access both documents, either at different times, in different sessions (either at different times or simultaneously), via different browser channels, or from different client devices. The coordination between such different modes of access for a user may be coordinated using credentials (e.g., user ID and password) that the user provides when logging onto the hosted computer system. Such credentials may be managed via a credentialing or authentication sub-system (not shown), and the sub-systems discussed herein may receive user ID information from client devices, provide it to the credentialing sub-system, and be told whether the user (or the client device) corresponds to a particular user account, so that the system 100 will provide content to the client device when requested. Such tracking of devices against a user account, and approval of devices to receive information tied to the user account, can occur in various manners and is well-known in the art.

In the figure, the hosted computer system 110 is shown as storing five items, including image 108. For example, a first and fourth item represent content copied from spreadsheets in a spreadsheet application (as indicated by the items being shown as grids). A second and fifth items represent word processing content, where the second item includes simply text from a document, and the fifth item represents text and an image.

The particular items may be stored separately from each other and may be accessed by the clipboard using unique item IDs. For example, the clipboard servers may separately maintain lists of item IDs that are currently in each user's clipboard, so that when a user requests (e.g., by making a menu selection) to see a list of item names (and perhaps associated metadata) items of content in their clipboard, the clipboard servers may first access the user's list using the user's ID, and may then access the names of each item in the user's list.

Each item may also have associated with it a list of users, or more particularly user accounts, that are authorized to access the item by pasting it into a document. For example, the user who initially adds the item to a clipboard may identify individual users (e.g., by email addresses, other user IDs, or other such mechanisms), by group (e.g., all members in the user's contacts list, or all such users tagged as "family" or "co-workers" or the like), all users from a particular domain (e.g., another quick way to identify co-workers in a corporate environment), or all users (e.g., by indicating that the item should be made public). When other users are identified for a clipboard item, they may be provided with a notice (e.g., via email message) that the item has been made available from their clipboard (e.g., via a clipboard menu selection when they are logged into the system 110) and may be shown a name for the item when they access a clipboard menu when they are interacting with an application supplied by the system 110.

Thus, using the system 100, one or more users may conveniently take content from a document in a first application or a first instance of an application, and may easily share it, through the cloud, with another application, another instance of the same application, or with other users. Such sharing may occur by a browser-based application executing on the first device capturing the content and passing it to the hosted computer system 110, and then a browser-based application on the second device requesting to see a representation of all items in the relevant clipboard (multiple users may also be provided with access to see a particular clipboard, and the shared clipboard may be a subset of one particular user's clipboard, or a union combination of clipboards for individuals (e.g. everything from the particular user's clipboard and all items that other users have share from their clipboards with the particular user), and then to request one of the items to have it passed to an application running on the second device, such as within a container document into which the content will be placed. The content may maintain its various formatting and other meta data as it is copied, or users may choose to paste the content without use of formatting, just as they can do for desktop-based clipboards.

Figure 2:
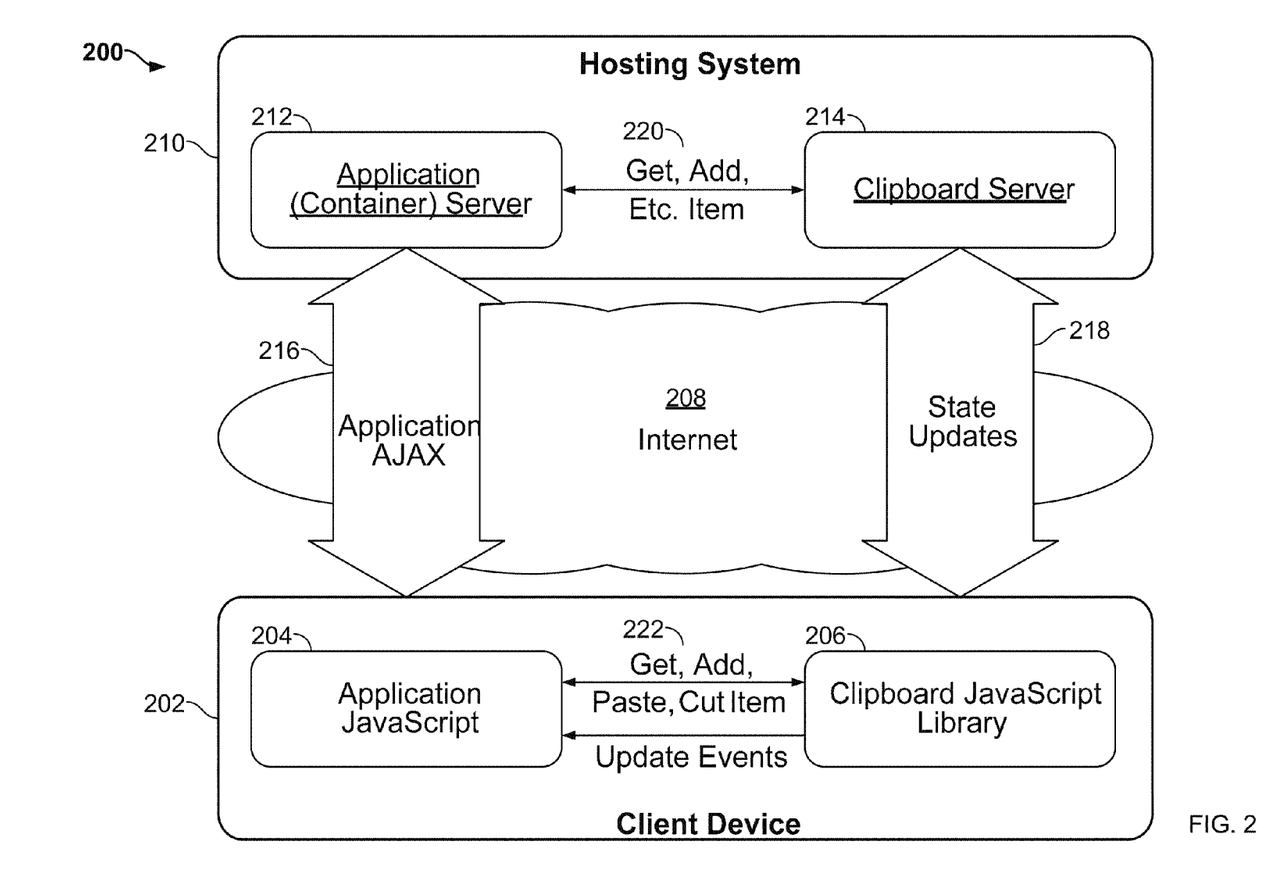
FIG. 2 is a schematic diagram of components in a hosted clipboard system.

FIG. 2 is a schematic diagram of components in a hosted clipboard system 200. In general, the system uses a two-part server system (that is part of a hosting system 210) to communicate with a two-part client system (on a client device 202) whose components mirror, to a large part, the main components in the server system. Each of two main components on the server side may communicate directly with a corresponding one of a pair of components on the client side. In turn, each of the server side components may communicate with each other, and each of the client side components may communicate with each other.

More specifically, in this example, an application server sub-system 212 communications with application JavaScript or similar executable code running on a web browser on a client device 202. The application server sub-system 212 is responsible for providing information for presenting an application (e.g., a word processing or spreadsheet program) by which a user can interact in a complete way with a document, such as a spreadsheet or word processing document. Such interaction may include the user adding typed information and images, formatting (e.g., changing fonts, font sizes, underlining, italics, and the like), alignment, page formatting, and other typical operations for the particular type of application. The server sub-system 212 may, for example, provide mark-up code (e.g., HTML and XML) over an application AJAX channel 216, which may cause JavaScript code to be delivered to the client device 202 for execution, which may in turn cause the client device 202 to further interact with the sub-system 212, such as to update a model of a document being edited by a user of the client device 202 (e.g., sending updates up to the sub-system 212 with substantially each user keystroke in a document, or reacting to menu selections by the user). Such communications, like other communications between the client device 202 and the hosting system 210 may occur over long distances on a network, which may include portions of the internet.

Other components operate to permit the passing of clipboard data from one location to another on the client device 202 or multiple different client devices, through the hosting system 210, in a cut-and-paste user interface paradigm. Specifically, a clipboard server sub-system 214 interacts with a clipboard JavaScript library 206 on the client through a state updates 218 channel, receives content from documents on which users are working, and provides such information back to the same or different documents (through the same channel), in a familiar cut/copy-and-paste clipboard user interaction. In this example, the master state for documents and for clipboard items resides on the hosting server system 210

The sub-systems 212, 214 on the hosting system 210 may communicate with each other, such as via remote procedure calls, as needed, to coordinate the sharing of information and to maintain security and authentication for the receipt of information. For example, when a user selects an item to paste into a document, the clipboard server 214 may supply the data for that item to the application server 212, which may in turn paste the item into the document. The application server 212 may know the location at which to add the item by keeping a status for the document model by tracking keystrokes and other inputs by the user via the application JavaScript 204. Similarly, the clipboard server 214 may obtain text from a document by getting it through an RPC from the application server 212.

Likewise, the components on the client device 202 (e.g., application JavaScript 204 for executing an application in a container document, and clipboard code in a child of the container document), may communication with each other so as to, for example, pass content to be copied from a container document that is executing the application JavaScript 204 to clipboard JavaScript, which may in turn forward the content to the clipboard server 214. The particular mechanism for moving content between and among the main components, and the path for such movement through the components, may be dictated by the particular environment in which the system 200 is to be implemented. Particular interactions between the components on the client device 202, may include communications from the application JavaScript 204 indicating that a user has invoke a command relevant to a hosted clipboard, such as by selecting a "paste" command. The application JavaScript 204 in such an implementation may communicate with the clipboard library 206 in order to obtain snapshots of each of the items in the user's relevant clipboard, from the clipboard server 214, which manages such information for the hosted system 210.

The manner in which a current state of a hosted clipboard may be updated in the system 200 may occur at least as a periodic process and an on demand process. In a periodic process, the client clipboard JavaScript may request, or the clipboard server 214 may push out, information that indicates changes to items in a hosted clipboard made since the prior update period. Such updating may occur by measuring expired time since a prior update, when a certain number of changes has occurred, or each time a change is made to the relevant clipboard. In an on-demand process, items are updated from the clipboard server 214 upon a user selection to see and access such items. For example, a user selection of a paste command may invoke the display of a list of items, and may thus in turn invoke a request from the client device 202 to the clipboard server to deliver a most-current version of them. While such information is being gathered, an icon can be displayed on a menu of choices so as to indicate that certain of the other items will be available soon and are being processed.

Figure 3:
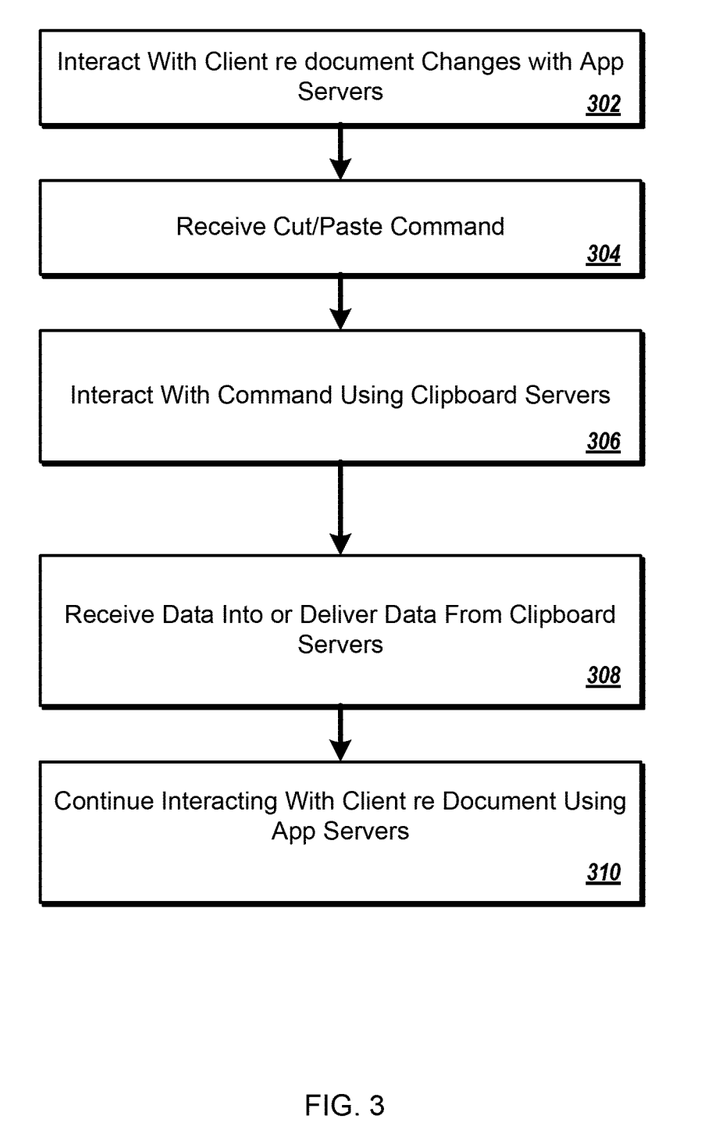
FIG. 3 is a flowchart showing a process for sharing content between applications in a hosted service.

FIG. 3 is a flowchart showing a process for sharing content between applications in a hosted service. In general, the process describes actions that a hosted server system may take in interacting with a remote computer user who is editing various documents, and who wants to share content between the documents. Such sharing may occur through the server system, and between two different sessions on the same device (e.g., through a process of turning a device off and then on again), between different sessions on different devices for a single logged on user account, or even between different accounts on different devices.

The example process begins at box 302, where an application server sub-system interacts with a client computing device regarding changes that a user of the device has made to a document, such as a word processing document. Such interaction may occur in a standard fashion, such as by providing a graphical user interface and the document itself using JavaScript executing in a container document on a web browser, where the JavaScript addresses an application server sub-system. In certain implementations, each user interaction that changes a model for the document (e.g., adding, deleting, or formatting characters) may be essentially immediately reflected in a master copy of the document model on the server system.

At box 304, an operation from the user that is relevant to a clipboard, such as a cut or paste command, is received from the user of the device. Such a selection may occur via a familiar keyboard combination (e.g., CTRL-C for copy) or by a user selecting an icon or other selectable control in a menu for the application. The user may then select a copy/cut or a paste operation from the menu.

In generating the menu, the process may interact with a clipboard server sub-system. For example, the selection of the menu may invoke JavaScript code running inside the container document that makes a call to a clipboard server system with identification information for the user of the device, and an indication that the code would like to receive in return a list of items that are currently in the user's clipboard (either personal or shared items from other users, or a combination of the two). The server sub-system may provide such information, and the JavaScript code may provide the data to the JavaScript code for the application, so that the information is displayed in an expanded portion of a menu in the application. Such information may also include preview information for the content for each clipboard item, so that a user can see a preview of the content when interacting with the menu selection.

At box 308, the user makes a selection from the menu (or completes a keyboard shortcut), so as to indicate an intent to provide selected content to, or received selected content from, the hosted clipboard. Such a selection may cause the clipboard server sub-system to pass the content to the appropriate clipboard JavaScript on the device, and the clipboard JavaScript in turn to pass the content for inclusion in the document using the application JavaScript. Alternatively, the clipboard sub-system could pass the content to the application sub-system, which could in turn add the content to the document, or pass the content to the application JavaScript, which could add the content to the document, and then synchronize with he application sub-system, such as to save the document back into the cloud.

At box 310, the user continues to interact with the document using the application sub-system. Thus, for example, the user could reformat the content that they just pasted into the document. The content at this point will be part of the document model that can be stored both on the client and server sub-systems, and that can be coordinated frequently as between those devices (e.g., on the order of once for every user-entered character). Such content may, after it is added to the document, lose its connection to its originating document or to the clipboard. In other instances, a connection may be maintained between the originating document and the target document so that, for instance, if the content is changed in the originating document, the corresponding content in the target can be changed automatically, or a user of the target document can be notified of the existence of a change to the content in the originating document. Also, as noted, the user may then choose to save the updated target document at some point, and the document may be saved automatically to the hosted or server system via the application server sub-system. In this manner, content can be shared conveniently from one document to another, with regard to whether the two documents are part of the same device, part of a single session, or at different devices and very different times.

Figure 4:
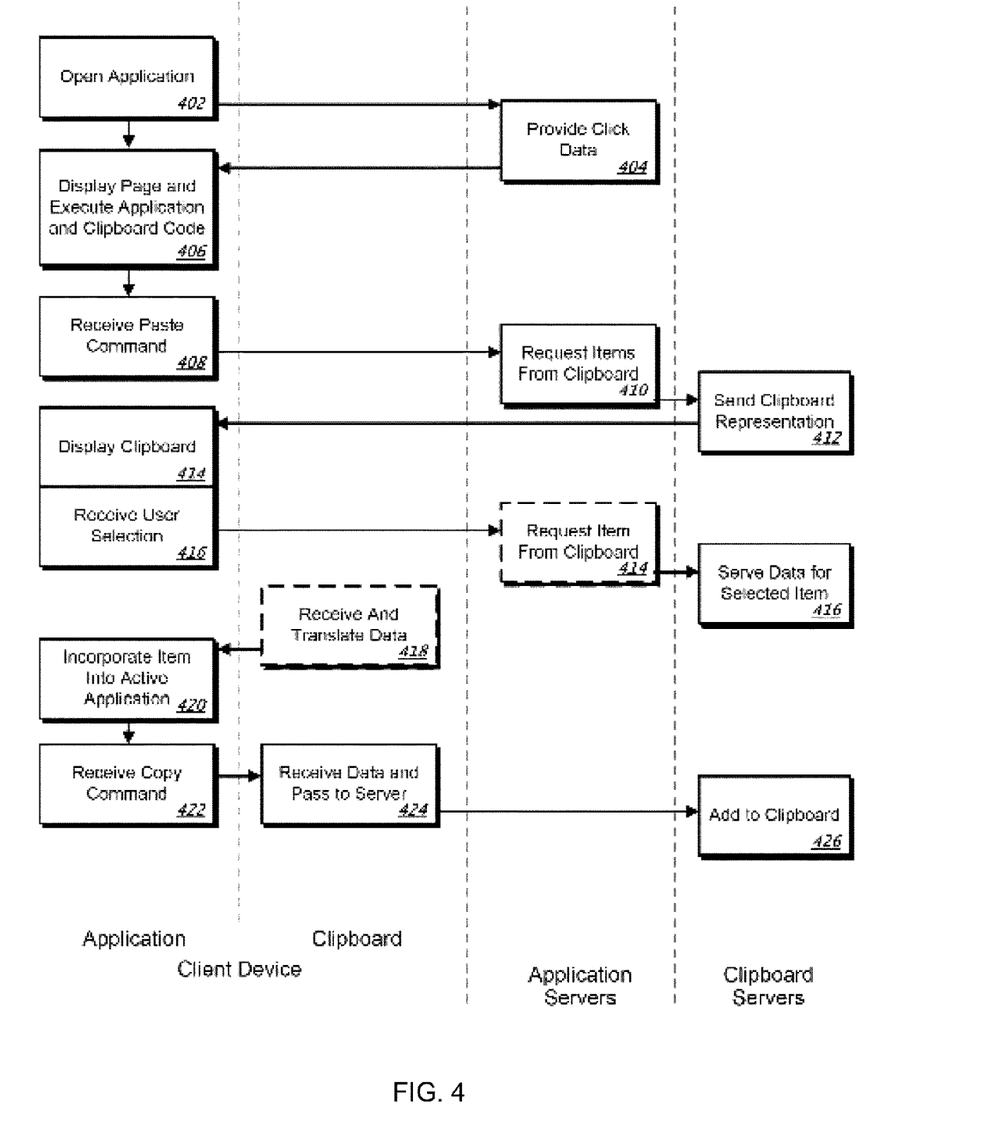
FIG. 4 is a flowchart showing copying and pasting operations in a hosted server system.

FIG. 4 is a flowchart showing copying and pasting operations in a hosted server system. The process is similar to that discussed with respect to FIG. 3, but shows example components that may provide certain functionality in one implementation. Those components include separate application and clipboard code (e.g., JavaScript) executing on a client device (which may correspond to the application JavaScript 204 and Clipboard JavaScript library 206 in FIG. 2), and separate application server and clipboard server sub-systems (which may correspond to application server 212 and clipboard server 214 in FIG. 2).

The process begins at box 402, where a user chooses to open an application for execution in their web browser. Such a selection causes the user's device to make a request (such as an HTTP request) to a hosted service that hosts the application servers. Mark-up code, including calls to certain application-related JavaScript, may be delivered to the client. The code may be executed at the client and the resulting application page may be displayed in the browser window (box 406). Such execution of code may include the calling of, and execution of, code for the application itself and for a clipboard provided in the application (though execution of some or all of the clipboard code may be delayed until a user invokes the clipboard functionality). The user may then interact with application, and data may pass between the application code and the application servers, using, for example, known AJAX techniques.

At box 408, the user's interaction with the application includes receipt by the application of a paste command 408 from the user. Such a selection may cause the application code (in this example) or the clipboard code (in other examples) to request information about a clipboard that corresponds to the user's account. The request, if sent from the client device to the application server, may be forwarded to the clipboard server (box 410). The clipboard server may then respond to the request, such as by providing data for displaying in the application a list of items that are currently in the clipboard (box 412). That data may be passed back to the client (in this example, directly to the application code, though in other examples to the clipboard code, and then on to the application code). Such a list of items may them be displayed to the user as a representation of their clipboard (box 414).

After the user has contemplated the options in his or her clipboard (which may include a selectable indicator for each item that has been copied into the clipbord and is available to the user for pasting), he or she may select one of the options—here, a selection of an item in the clipboard that the user would like to paste into a document that is active in the hosted application (box 416). In this example, the selection is sent to the clipboard server rather than the application server because the clipboard server is tasked with serving the information to the client device. The selection may cause a request (e.g., an HTTP request) to be transmitted that includes an identifier for the particular clipboard item and a identifier (e.g., an integer) that identifies the format (such as a MIME-type) in which the content is to be supplied to the active application. The selection may also be communicated to the application server (box 417) which may in turn provide it to the clipboard server.

The clipboard may then serve the content for the selected item to the application (box 418). Such serving may be preceded by a modification to the formatting of the content. Such modification may occur by consulting mapping data that defines rules for changing content in a first format to content in a second format (the format selected by the user or a format that is inherent in the active document being edited in the application).

In certain implementations, the content may be provided to the clipboard code executing on the client (box 419) or may be provided to the application code, which may then incorporate the content into the active document that is being editing (box 420). Later, a user may highlight other content and may select a copy command from a menu or keyboard combination (box 422). The selected content may then be passed automatically to he clipboard code (box 424) and forwarded to the clipboard server (box 424), which may process the data and add the content to the clipboard. For example, the clipboard server may determine a label for the content, an application type from which the content came (e.g., so as to be able to display an icon when the item is shown in a future menu), and other meta data for the content (e.g., that it is an x by y portion of a spreadsheet).

The process may then continue, as a user chooses to take other content from an application and put it on her clipboard, or to take content off the clipboard and put it into an application she is running. Such interaction may occur across multiple sessions, multiple different computers and computer types (e.g., desktop, laptop, smart phone, etc.), and across different users, when a posting user has indicated that newly-added content to a clipboard should be shared with other users.

Figure 5A:
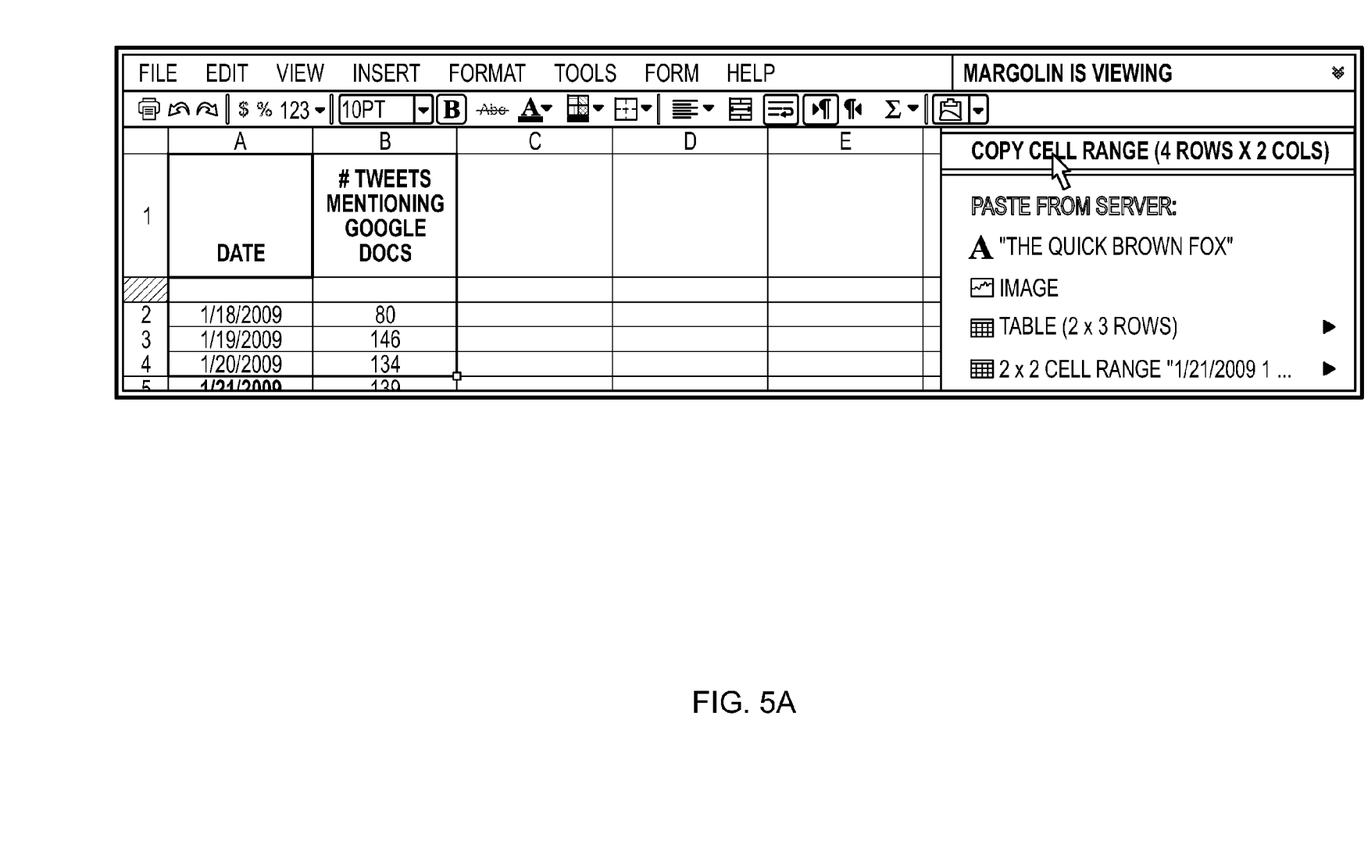
FIGS. 5A and 5B are example screen shots of clipboard interaction in a hosted server system.
Figure 5B:
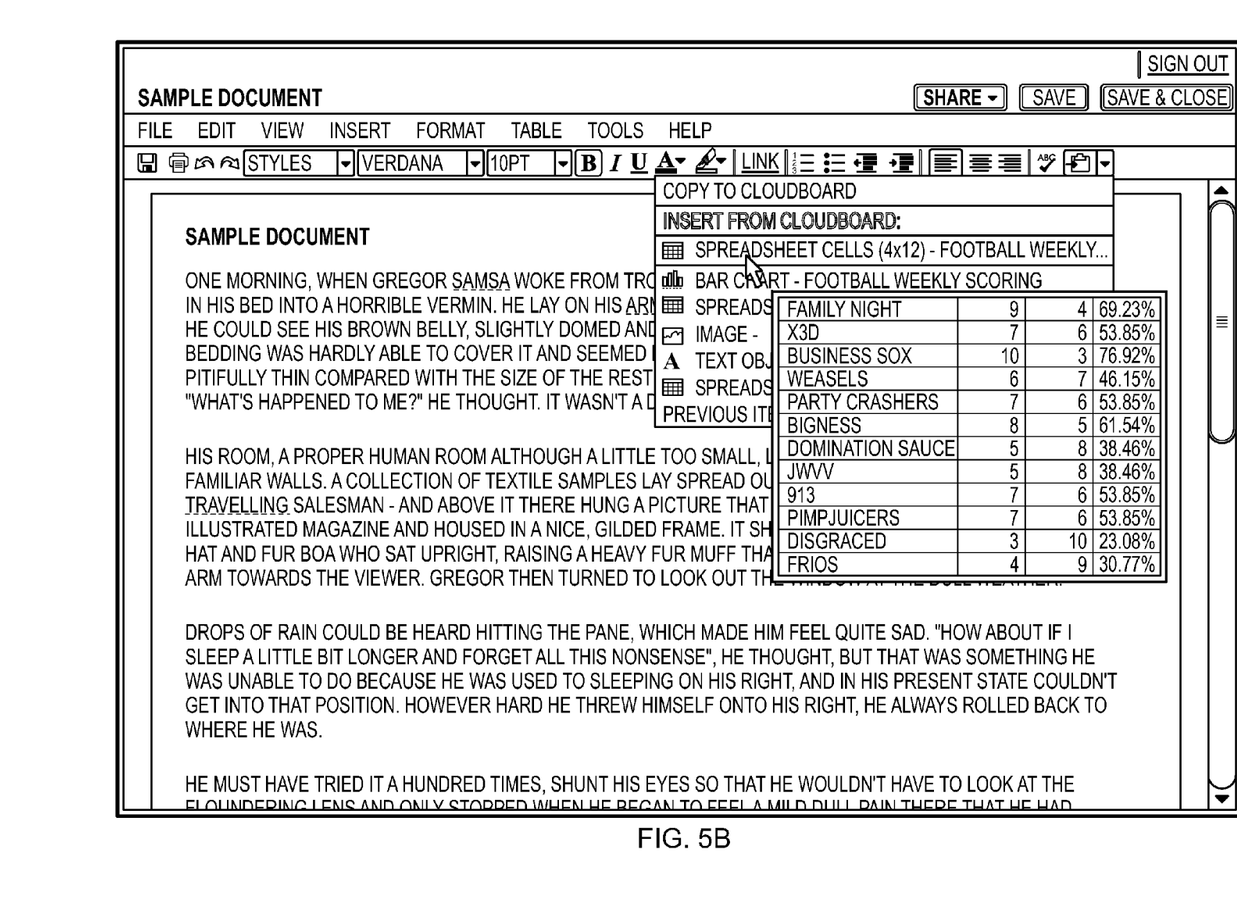

FIGS. 5A and 5B are example screen shots of clipboard interaction in a hosted server system. FIG. 5A shows an example of a copying operation from a spreadsheet document, while FIG. 5B shows an example of a pasting command into a word processing document.

In FIG. 5A, a user has created a simple two-column spreadsheet, and has highlighted four rows of the spreadsheet—the heading row and three data rows. The user has also selected a clipboard control in a top menu for the spreadsheet application, which may be presented in a presentation pane of a web browser. The icon shows a folder in a cloud, representing a clipboard provided by a hosted computing service (a cloudboard). A pull down menu is shown as resulting from the user's selection, and four options are shown for the user's selection. The top selection is a selection to copy the selected cell range from the spreadsheet that the user is in the process of editing. Such context is provided by the label on the selection: "Copy cell range (4 rows×2 cols)." Such a selection by the user will cause an entry for that selection to appear on the user's subsequent accessing of their clipboard, and in the content from the spreadsheet being copied to the clipboard portion of the service system that provides the application and clipboard functionality, along with the formatting to indicating that the headings are to be in a bold font, and that all the cells are center-aligned, a certain font, and a certain font size. Also, formulas may be copied in their base form where they are present in the spreadsheet.

The remaining four selections represent content that has already been provide to the user's clipboard and is available for pasting into the spreadsheet by the user. The clipboard client code or server code may have previously determined the types of content that can be added to a spreadsheet, and may have filtered out items in the user's clipboard that are not compatible. In this example, the items that are available for pasting into the spreadsheet are some text that is or begins with, "The quick brown fox"; an image (where in some examples the icon next to the label can be a thumbnail of the actual image that has been generated by and provided by a clipboard server sub-system; a 2×3 table, apparently from a word processing document originally; and a 2×2 cell range that starts with a cell entry of "1/21/2009." The descriptions for various items may vary from those shown here, but may generally be selected in a manner that provides some substantial indication of the character of the content that corresponds to the particular item.

FIG. 5B shows a similar selection that has been made from a menu in a word processing application so as to paste content into a word processing document that a user is editing. Here, the copy command is simply "Copy to Cloudboard," and there are seven selects for pasting from the Cloudboard. In this example, the user has hovered their pointer momentarily over the first item, which is a 4×12 portion of a spreadsheet document entitled "Football weekly." As a result, a preview of the content for that item in the clipboard is displayed in a pop up window over the menu. Such a display, because of its relative small size, and to conserve computing resources, may omit formatting, images or other information. The display may also be of a thumbnail image of all or a portion of the content. Thus, as shown, a user can quickly select content to be copied to a clipboard and content to be pasted from a clipboard, and may do so from with an relevant application itself so that the interface for the user is much like an interface for copying of content in desktop-based productivity applications.

The interactivity here can also be coordinated with clipboards that are otherwise available to a user via an operating system. For example, content copied by a user may be provided simultaneously to a user's operating system clipboard and to a cloudboard (though the cloudboard may store additional items that have been selected in other computing sessions or from different computing devices). Also, certain copying and pasting operations by a user may interact with an operating system-based clipboard while others may interact with a cloudboard. For example, selections in a menu of a hosted application executing in a browser may invoke the cloudboard, while keyboard combinations (e.g., CTRL-C, CTRL-X, and CTRL-V) may invoke the operating system-based clipboard or both clipboards.

Figure 6:
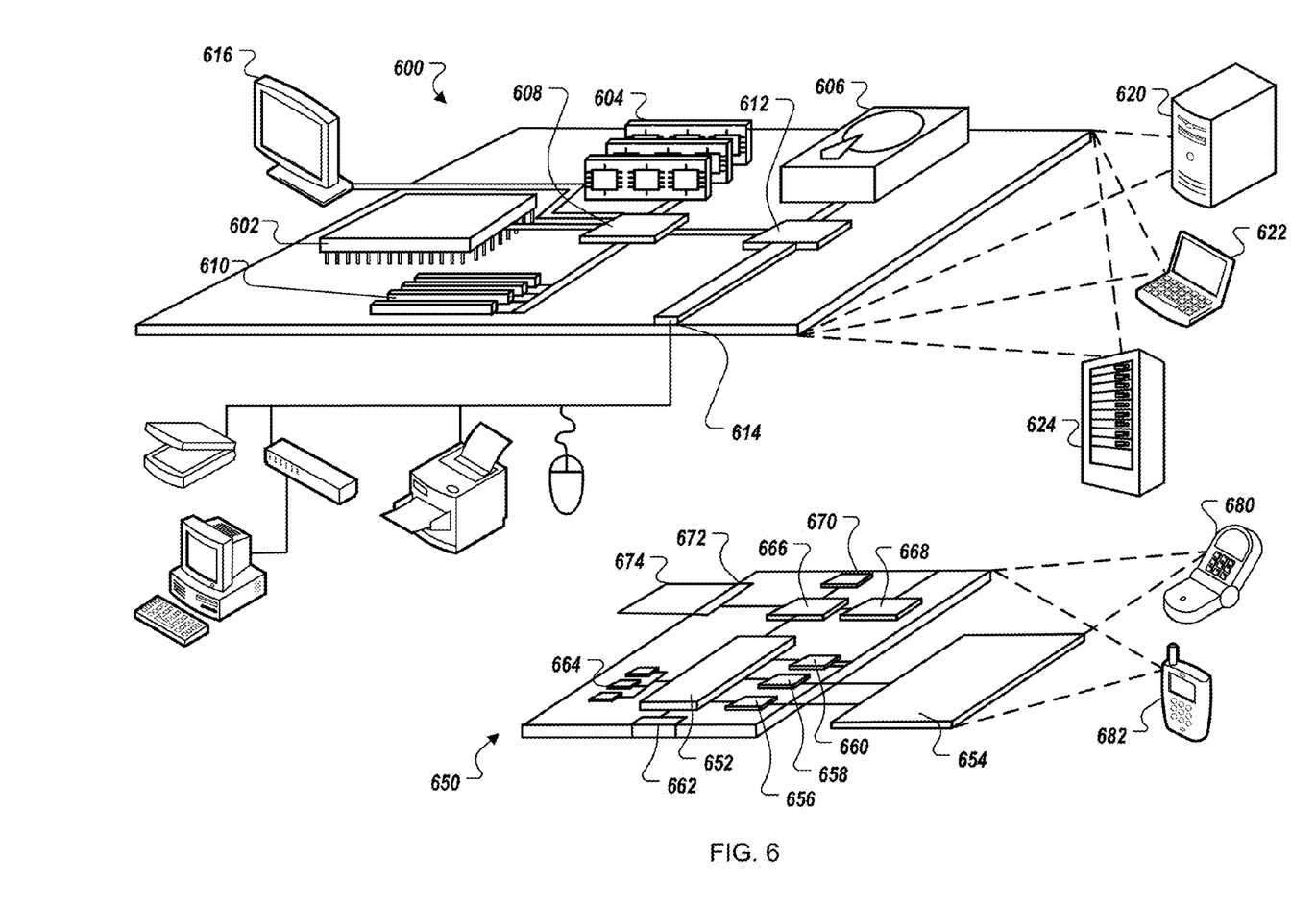
FIG. 6 is a block diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A computer-implemented method of sharing data between computer applications, the method comprising:

receiving, at an application server sub-system of a hosted computer server system and from a first computing device that is remote from the hosted computer server system, commands interacting with a first electronic document that is presented on the first computing device by a first application, wherein the first application is executed, at least in part, by the application server sub-system;

receiving, at the hosted computer server system, a first command to copy content from the first electronic document that is presented on the first computing device by the first application to an electronic clipboard that is maintained by the hosted computer server system, wherein the first command includes an identifier for the content within the first electronic document, the content not being transferred from the first computing device and to the hosted computer server system in association with the first command to copy;

identifying, by the hosted computer server system and using the identifier, the content in data that is local to the hosted computer server system and that represents the first electronic document;

causing the content identified in the data that is local to the hosted computer server system to be transferred to a clipboard server sub-system of the hosted computer server system for addition to the electronic clipboard;

in response to receiving the first command to copy the content, storing, at the clipboard server sub-system of the hosted computer server system, that is separate from the application server sub-system, the data that represents the content;

receiving, at the application server sub-system of the hosted computer server system and from a second computing device that is remote from the hosted computer server system, a second command to paste the content from the electronic clipboard into a second electronic document presented on the second computing device by a second application, wherein the second application is executed, at least in part, by the application server sub-system; and in response to receiving the second command to paste the content, providing, from the clipboard server sub-system to the second computing device, the data that represents the content.

2. The method of claim 1, wherein the second computing device is different from the first computing device.

3. The method of claim 1, further comprising determining that the second computing device has authority to access the data that represents the content by determining that the second computing device has been authenticated to a user account that matches a user account to which the first computing device was authenticated.

4. The method of claim 1, further comprising determining that the second computing device has authority to access the data that represents the content, by accessing a user account to which the first computing device was authenticated when the data was stored at the hosted computer system and locating an identifier for a user account to which the second computing device is authenticated.

5. The method of claim 1, wherein the application server sub-system interacts with a first container document of a browser executing on the first computing device, and the clipboard server sub-system interacts with a child element of a second container document of a browser executing on the second computing device that correlates to the first container document of the browser executing on the first computing device.

6. The method of claim 1, further comprising receiving from the first computing device a command to show the contents of the electronic clipboard, and delivering from the clipboard server sub-system to the first computing device, data that represents each item in the electronic clipboard determined to correspond to a user account to which the first computing device has been authenticated.

7. The method of claim 6, further comprising receiving, at the application server sub-system from the first computing device, a third command to paste content from the electronic clipboard into an electronic document presented in a container document, and in response to receiving the third command to paste the content, providing the content from the clipboard server sub-system to a child element that is operating inside the container document into which the content is to be pasted.

8. The method of claim 7, further comprising receiving from the first computing device a content format indicator and translating the content to a format that corresponds to the content format indicator before providing the content to the child element.

9. The method of claim 1, wherein the electronic document is selected from a group consisting of a word processing document, a spreadsheet, a presentation document, and an electronic mail message.

10. The method of claim 1, further comprising receiving, by the hosted computer server system, a command to show a preview of a clipboard item, and providing a thumbnail image of content for the clipboard item in response to receiving the command to show a preview.

11. A computer-implemented system for sharing data between computer applications on a hosted computer service, the system comprising:

one or more web servers arranged to interact over the internet with computing devices that are remote from the hosted computer service;

an application server sub-system that is programmed to provide data, through the one or more web servers, for displaying interactive computer applications in container documents on browsers of the computing devices; and a clipboard server sub-system that is programmed to store content that is correlated to user accounts of the hosted computer service, and programmed to provide the content to child elements inside the container documents, wherein the hosted computer service is programmed to perform operations comprising:

receiving, at the application server sub-system and from a first computing device that is remote from the hosted computer service, a first command to copy content from a first electronic document to an electronic clipboard that is maintained by the hosted computer service, wherein the first electronic document is presented in a first container document on the first computing device and the first command includes an identifier for the content within the first electronic document, the content not being transferred from the first computing device and to the hosted computer server system in association with the first command to copy;

identifying, by the hosted computer server system and using the identifier, the content in data that is local to the hosted computer server system and that represents the first electronic document;

causing the content identified in the data that is local to the hosted computer server system to be transferred to the clipboard server sub-system of the hosted computer server system for addition to the electronic clipboard;

in response to receiving the first command to copy the content, storing, at the clipboard server sub-system, the data that represents the content;

receiving, at the application server sub-system and from a second computing device that is remote from the hosted computer service, a second command to paste the content from the electronic clipboard into a second electronic document presented in a second container document on the second computing device; and in response to receiving the second command to paste the content, providing, by the clipboard server sub-system to the second computing device, the data that represents the content.

12. The computer-implemented system of claim 11, wherein the application server sub-system is further programmed to save the data that represents the content with the second electronic document being edited in the second container document after the data that represents the content has been added to the second electronic document.

13. The computer-implemented system of claim 11, further comprising an authentication server sub-system programmed to associate user accounts with each of the computing devices, and to provide user account identifiers to the clipboard server sub-system for determining a user-account to associate with each clipboard entry.

14. The computer-implemented system of claim 13, wherein the authentication server sub-system is further programmed to cooperate with the clipboard server sub-system to identify users, other than a user who corresponds with a particular clipboard, that may access one or more items of content from the particular clipboard.

15. The computer-implemented system of claim 14, wherein accessibility by a user to an item of content in a particular clipboard is determined by analyzing a user list prepared by a user that corresponds to the particular clipboard.

16. The computer-implemented system of claim 11, wherein the application server sub-system is further programmed to interact with the first container document of a browser executing on a first computing device, and the clipboard server sub-system is further programmed to interact with a child element of the second container document of a browser executing on a second computing device, wherein the second container document of the browser on executing on the second computing device correlates to the first container document of the browser executing on the first computing device.

17. The computer-implemented system of claim 16, wherein the clipboard server sub-system is further programmed to receive from the first computing device a command to show the contents of the electronic clipboard, and in response, to deliver from the clipboard computer server sub-system to the first computing device, data that represents each item in the electronic clipboard determined to correspond to a user account to which the first computing device has been authenticated.

18. The computer-implemented system of claim 17, wherein the clipboard server sub-system is further programmed to receive from the first container document a command to paste content from the electronic clipboard into the first electronic document presented in the first container document, and to provide the content from the electronic clipboard to a child element that is operating inside the first container document.

19. The computer-implemented system of claim 11, wherein the clipboard server sub-system is further programmed to receive a content format indicator and to translate the content to a format that corresponds to the content format indicator before providing the content to a child element.

* * * * *